United States Patent
Mikawa

(10) Patent No.: US 9,588,993 B2
(45) Date of Patent: Mar. 7, 2017

(54) IMAGE DISPLAY APPARATUS AND CONTROL METHOD THEREOF

(71) Applicant: CANON KABUSHIKI KAISHA, Tokyo (JP)

(72) Inventor: Chiaki Mikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 14/023,499

(22) Filed: Sep. 11, 2013

(65) Prior Publication Data

US 2014/0081976 A1    Mar. 20, 2014

(30) Foreign Application Priority Data

Sep. 18, 2012 (JP) ................... 2012-205036

(51) Int. Cl.
*G06F 17/30* (2006.01)

(52) U.S. Cl.
CPC .... *G06F 17/3028* (2013.01); *G06F 17/30265* (2013.01)

(58) Field of Classification Search
None
See application file for complete search history.

(56) References Cited

U.S. PATENT DOCUMENTS 7,920,760 B2 *    4/2011    Yoda ................. G06F 17/30265
                                                        358/1.15

FOREIGN PATENT DOCUMENTS

JP    2008-003910 A    1/2008

\* cited by examiner

*Primary Examiner* — Belix M Ortiz Ditren
(74) *Attorney, Agent, or Firm* — Carter, DeLuca, Farrell & Schmidt, LLP

(57) ABSTRACT

An image display apparatus which displays a list of image data, comprises a selection unit configured to select a classification condition of image data; a designation unit configured to designate a sort condition associated with a sorting order of image data; a grouping unit configured to execute grouping of image data according to the classification condition selected by the selection unit; a determination unit configured to determine whether or not to execute the grouping according to the classification condition selected by the selection unit and the sort condition designated by the designation unit; and a control unit configured to control whether or not image data are grouped and displayed in accordance with a determination result of the determination unit.

18 Claims, 14 Drawing Sheets

FIG. 2

| | 201 | 202 | 203 | 204 | 205 | 206 | 207 | 208 | 209 |
|---|---|---|---|---|---|---|---|---|---|
| | INDEX | FILE NAME | FOLDER PATH | EXTENSION | SHOOTING DATE AND TIME | RATING | SHOOTING LOCATION | FILE TYPE | REDUCED IMAGE DATA |
| 211 | 1 | AAA_043.jpg | C:¥Picture ¥HOME | jpg | 2009¥12¥25 ¥13¥22¥50 | 2 | JAPAN¥ TOKYO-TO¥ OTA-KU | STILL IMAGE¥ JPEG IMAGE | XXXX |
| 212 | 2 | DDD_001.mov | C:¥Picture ¥HOME | mov | 2009¥08¥30 ¥18¥30¥14 | 2 | JAPAN¥ TOKYO-TO¥ OTA-KU | MOVING IMAGE¥ HIGH-FRAME RATE MOVING IMAGE | XXXX |
| 213 | 3 | BBB_0009.mov | C:¥Picture ¥PRESCHOOL | mov | 2012¥10¥23 ¥9¥10¥48 | 1 | JAPAN¥ KANAGAWA-KEN¥ KAWASAKI-SHI | MOVING IMAGE¥ NORMAL MOVING IMAGE | XXXXX |
| | ... | ... | ... | ... | ... | ... | ... | ... | ... |
| | n | FFF_0003.jpg | C:¥Picture ¥FRIEND | jpg | 2009¥06¥06 ¥10¥15¥37 | 3 | JAPAN¥ TOKYO-TO¥ MINATO-KU | STILL IMAGE¥ JPEG IMAGE | XXXX |

| | CLASSIFICATION CONDITION TYPE (501) | SORT CONDITION (502) |
|---|---|---|
| 503 | FOLDER | FILE NAME |
| 504 | SHOOTING YEAR-MONTH-DAY | SHOOTING DATE AND TIME |
| 505 | RATING | RATING |
| 506 | FILE TYPE | EXTENSION |
| 507 | LOCATION | PLACE-NAME |

FIG. 7

| | CLASSIFICATION CONDITION | GROUPING INFORMATION |
|---|---|---|
| 703 | YEAR OF YEAR-MONTH-DAY | MONTH |
| 704 | MONTH OF YEAR-MONTH-DAY | DAY |
| 705 | DAY OF YEAR-MONTH-DAY | HOUR |
| 706 | FOLDER | FOLDER IMMEDIATELY UNDER WHICH TARGET IMAGE FILE IS INCLUDED |
| 707 | RATED OF RATING | RATING VALUE |
| 708 | STILL IMAGE OF FILE TYPE | STILL IMAGE TYPE |
| | MOVING IMAGE OF FILE TYPE | MOVING IMAGE TYPE |
| 709 | COUNTRY OF LOCATION | PREFECTURE |
| 710 | PREFECTURE OF LOCATION | CITY |

701 (header: CLASSIFICATION CONDITION)
702 (header: GROUPING INFORMATION)

IMAGE DISPLAY APPARATUS

▽ FOLDER

▽ ALL IMAGES
 ▽ PICTURES
  ◇ HOME
  ◇ PRESCHOOL
  ◇ FRIEND

▽ SHOOTING DATE
 ▽ 2009
  △ JUNE
  △ AUGUST
  △ SEPTEMBER
  △ DECEMBER
 △ 2010
 △ 2011
 △ 2012

SORTING | FILE NAME ORDER ▽

◇ 2009

2009/12/25 AAA_0043.jpg
2009/8/30 DDD_0001.mov
2009/9/10 DDD_0010.jpg
2009/6/6 FFF_0001.jpg
2009/6/6 FFF_0002.jpg
2009/6/6 FFF_0003.jpg

F I G. 12

IMAGE DISPLAY APPARATUS ✕

▽ FOLDER ◇ OCTOBER
▽ ALL IMAGES ◇ 23 th
　▽ PICTURES
　　◇ HOME
　　◇ PRESCHOOL 2012/10/23
　　◇ FRIEND BBB_0009.mov
▽ SHOOTING DATE ◇ 31 th
△ 2009
△ 2010
△ 2011 2012/10/31
△ 2012 GGG_0055.jpg
　△ MARCH
　△ OCTOBER 2012/10/31
　　◇ 23 th GGG_0056.jpg
　　◇ 31 th

SORTING | SHOOTING DATE AND TIME ORDER ▽

IMAGE DISPLAY APPARATUS

◇ RATED

| | | | |
|---|---|---|---|
| 2009/6/6 FFF_0002.jpg | 2009/6/6 FFF_0003.jpg | 2009/8/30 DDD_0001.mov | 2009/9/10 DDD_0010.jpg | 2009/12/25 AAA_0043.jpg |
| 2010/4/14 BBB_0001.jpg | 2010/6/1 BBB_0002.jpg | 2010/8/10 AAA_0090.jpg | 2012/10/23 BBB_0009.mov | 2012/10/31 GGG_0055.jpg |
| 2012/10/31 GGG_0056.jpg | | | | |

▷ FOLDER
△ SHOOTING DATE
▽ RATING
  ▽ RATED
    ◇ RATING 1
    ◇ RATING 2
    ◇ RATING 3
    ◇ UNRATED
▽ FILE TYPE
  ▽ STILL IMAGE
    ◇ JPEG IMAGE
  ▽ MOVING IMAGE
    ◇ NORMAL MOVING IMAGE
    ◇ INTERVAL MOVING IMAGE
▽ LOCATION
  ▽ JAPAN
    △ TOKYO
    △ KANAGAWA

| SORTING | SHOOTING DATE AND TIME ORDER ▽ |

IMAGE DISPLAY APPARATUS AND CONTROL METHOD THEREOF

BACKGROUND OF THE INVENTION

Field of the Invention

The present invention relates to an image display technique for displaying a list of images.

Description of the Related Art

Conventionally, an application which displays a list of images on a display connected to an information processing apparatus such as a personal computer (PC) is available. In such application, when image data is recorded in the PC, a plurality of image data are recorded while being grouped in accordance with shooting dates and times, shooting locations, and events, so as to allow the user to efficiently find out images.

For example, Japanese Patent Laid-Open No. 2008-003910 describes an image display apparatus, which groups and displays large quantities of images for respective folders.

However, with Japanese Patent Laid-Open No. 2008-003910, when the user designates a sort condition such as an order of file names or shooting dates and times, since images are always sorted within individual groups, it is difficult for the user to find out desired images.

SUMMARY OF THE INVENTION

The present invention has been made in consideration of the aforementioned problems, and realizes an image display technique which allows the user to easily find desired images by switching whether or not to execute grouping according to a search condition and sort condition designated by the user upon displaying a list of images.

In order to solve the aforementioned problems, the present invention provides an image display apparatus which displays a list of image data, comprising; a selection unit configured to select a classification condition of image data; a designation unit configured to designate a sort condition associated with a sorting order of image data; a grouping unit configured to execute grouping of image data according to the classification condition selected by the selection unit; a determination unit configured to determine whether or not to execute the grouping according to the classification condition selected by the selection unit and the sort condition designated by the designation unit; and a control unit configured to control whether or not image data are grouped and displayed in accordance with a determination result of the determination unit.

In order to solve the aforementioned problems, the present invention provides a control method of an image display apparatus which displays a list of image data, the method comprising; a selection step of selecting a classification condition of image data; a designation step of designating a sort condition associated with a sorting order of image data; a grouping step of executing grouping of image data according to the selected classification condition; a determination step of determining whether or not to execute the grouping according to the selected classification condition and the designated sort condition; and a control step of controlling whether or not image data are grouped and displayed in accordance with the determination result.

According to the present invention, the user can easily find desired images by switching whether or not to execute grouping according to a search condition and sort condition designated by the user upon displaying a list of images.

Further features of the present invention will become apparent from the following description of exemplary embodiments (with reference to the attached drawings).

BRIEF DESCRIPTION OF THE DRAWINGS

FIG. 2 is a conceptual view of a database used in image display processing according to the embodiment;

FIG. 3 is a view showing an example of a UI window displayed by the image display processing according to the embodiment;

FIG. 5 is a table showing an example of the correspondence relationship between classification condition types and sort conditions in the image display processing according to the embodiment;

FIG. 7 is a table showing an example of the correspondence relationship between classification conditions and grouping information in the image display processing according to the embodiment;

FIG. 9 is a view showing an example of a UI window displayed by the image display processing according to the first embodiment;

FIG. 11 is a view showing an example of the UI window displayed by the image display processing according to the first embodiment;

FIG. 12 is a view showing an example of the UI window displayed by the image display processing according to the first embodiment;

FIG. 13 is a view showing an example of a UI window displayed by image display processing according to the second embodiment; and FIG. 14 is a view showing an example of the UI window displayed by the image display processing according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

An embodiment in which an image display apparatus according to the present invention is applied to an information processing apparatus such as a personal computer (PC) which displays image data transferred from an image capturing apparatus such as a digital camera will be described below.

<Apparatus Configuration>

An overview of the configuration and functions of an information processing apparatus of an embodiment according to the present invention will be described below with reference to FIG. 1.

The information processing apparatus of this embodiment is, for example, a client PC which communicates with a server via a network, and displays a list of image data fetched by an image display processing application running on the PC from an image capturing apparatus or the server by switching whether or not to execute grouping according to a classification condition and sort condition designated by the user.

Figure 1:
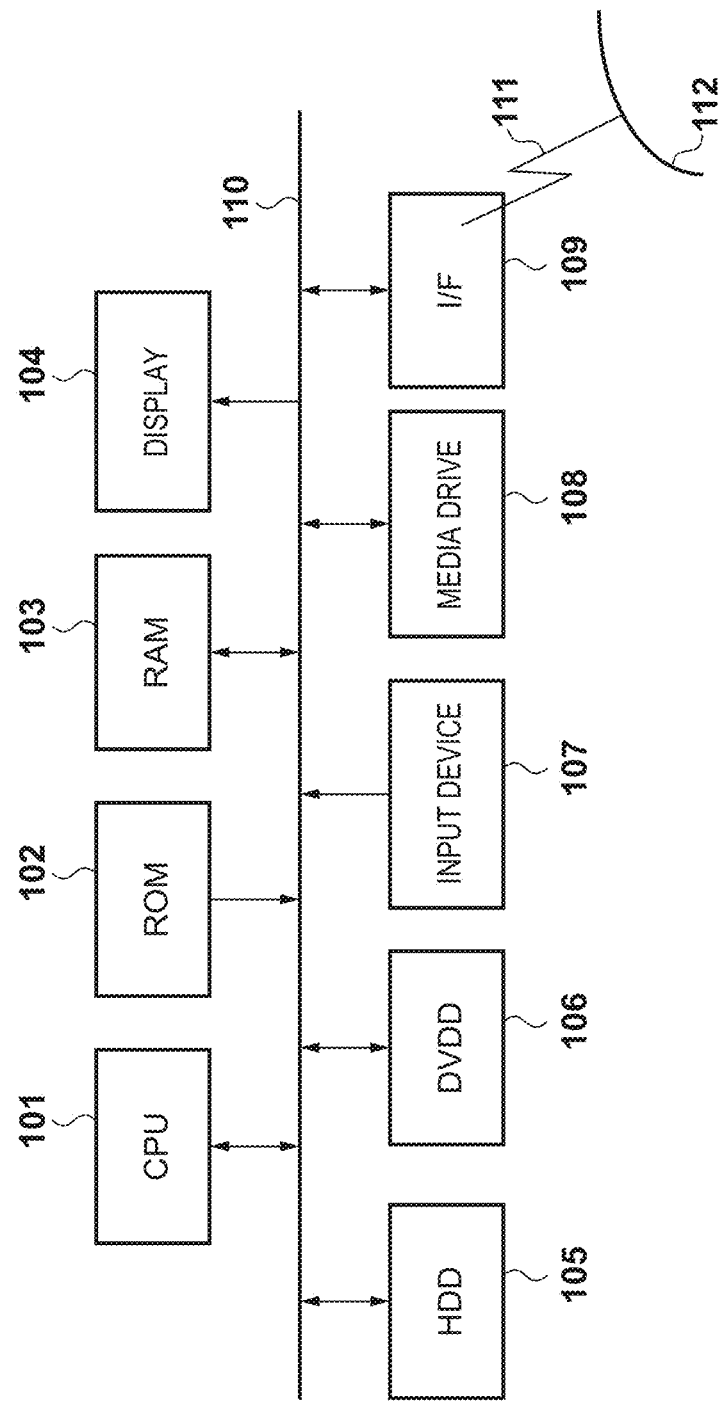
FIG. 1 is a block diagram showing the apparatus configuration according to an embodiment.

Referring to FIG. 1, reference numeral 101 denotes a CPU which controls the overall apparatus. Reference numeral 102 denotes a ROM which stores operation processing sequences (for example, programs of activation processing, basic input/output processing, and the like of the computer) of the CPU 101. Reference numeral 103 denotes a RAM which functions as a main memory of the CPU 101. Onto the RAM 103, control programs and the like required to implement various kinds of processing (to be described later) executed by the CPU 101 are read out from a nonvolatile memory or the like. Also, the PAM 103 provides a work area when the CPU 101 executes various kinds of processing.

Reference numeral 105 denotes a hard disk drive (to be abbreviated as HDD hereinafter); and 106, a DVD drive (to be abbreviated as DVDD hereinafter). The HDD 105 and DVDD 106 are respectively used to store and load application programs, data, libraries, and the like. In place of or in addition to the DVDD, an optical (magnetic) disk drive of a CD-ROM, MO, or the like, a magnetic tape drive such as a tape streamer or DDS, and the like may be arranged.

Reference numeral 107 denotes an input device such as a keyboard and pointing device used to accept user operations. Reference numeral 104 denotes a display, which outputs various kinds of information (to be described later) under the control of the CPU 101.

Reference numeral 108 denotes a media drive to which a storage medium such as a memory card is detachable, and which can read out image data of moving images, still images, and the like shot and stored by the image capturing apparatus. Reference numeral 109 denotes a communication interface (I/F), which can be connected to a computer network 112 such as the Internet via a wired or wireless communication line 111. The information processing apparatus of this embodiment exchanges image data and the like with an external apparatus with which communications can be made via the computer network 112 by means of the network I/F 109 and communication line 111. Reference numeral 110 denotes a system bus (including an address bus, data bus, and control bus) which interconnects the aforementioned blocks.

Assume that image data as display processing targets of this embodiment are stored in the HDD 105.

[Processing Target Data]

Data as display processing targets of this embodiment include still image data and moving image data fetched from the image capturing apparatus.

Each of still image data and moving image data holds attribute information and reduced image data (thumbnail data) for list display in a header of a file or an associated file. The attribute information includes information related to a shooting date and time, shooting location, and other shooting conditions, and information required to read out or reproduce image data.

The attribute information of the still image data includes a shooting date and time, a shooting location, a rating, a file type, an identifier, model information, and owner name of the image capturing apparatus, and the like. In this embodiment, assume that the shooting location is obtained when the image capturing apparatus acquires latitude/longitude information using a GPS and converts that information into place-name information via a communication with a server. The rating expresses a user's evaluation by a numeric value, and an evaluation value is appended to each image data. For example, in case of image data shot by the image capturing apparatus, a value "0" is recorded in a rating storage area. The rating=0 means no evaluation, and is handled as no rating appended.

The attribute information of the moving image data includes a recording duration, a recording start time, a recording end time, the number of frames recorded per sec, the number of frames to be reproduced per sec, information related to an audio, and the like in addition to that of the still image data.

In the following description, the still image data or moving image data will be generically called as an image or image data to be used.

In this embodiment, assume that information indicating a property of image data is recorded in the file type.

In the information processing apparatus of this embodiment, the CPU 101 manages locations of image data on a storage medium using file information such as folders and file names.

In this embodiment, the CPU 101 executes image display processing (to be described later) using the aforementioned attribute information and file information.

[Database]

The configuration of a database used to manage image data by the information processing apparatus of this embodiment will be described below with reference to FIG. 2.

In this embodiment, the CPU 101 loads all image data stored in the HDD 105 at an initial activation timing, and generates a database (to be abbreviated as DB hereinafter) shown in FIG. 2 by associating the image data with the attribute information and file information. Then, the CPU 101 stores the DB in the HDD 105. Search processing and sort processing (to be described later) are implemented when the CPU 101 uses the DB shown in FIG. 2.

A column 201 stores an INDEX used to uniquely specify data in the DB. Every time the CPU 101 registers data in the DB, a value incremented in turn from 1 is stored for each image data.

Columns 202, 203, and 204 respectively stores a file name, folder path, and file extension. The CPU 101 loads these parameters from the file information of each image data, and stores the read parameters.

Columns 205, 206, 207, and 208 respectively store information of a shooting date and time, a rating, a shooting location, and a file type.

The CPU 101 loads the shooting date and time 205, shooting location 207, and file type 208 from the attribute information of each image data, converts them into information indicating a hierarchical structure required for processing (to be described later), and stores the converted information. In this embodiment, a break of a layer where an inclusive relation of information changes is indicated using a letter "¥". As for the shooting date and time 205, information of a shooting date and time acquired by the CPU 101 from the attribute information is decomposed into a hierarchical structure of year, month, date, hour, min, and sec, which are stored by delimiting respective layers using ¥.

As for the shooting location 207, a shooting location acquired by the CPU 101 from the attribute information is decomposed into a hierarchical structure of country, prefecture, and city/ward, which are stored by delimiting respective layers using ¥.

As for the file type 208, a property of a file acquired by the CPU 101 from the attribute information is decomposed into a hierarchical structure, which is stored by delimiting respective layers using ¥. A JPEG-compressed image is expressed as "still image¥JPEG image". When a file property is a MOV format, and the number of frames recorded per sec and that to be reproduced per frame are equal to each other, the file type is expressed by "moving image¥normal moving image". When the file property is a MOV format and the number of frames recorded per sec is larger than that to be reproduced per sec, the file type is expressed by "moving image¥high-speed moving image". A high-speed moving image is a moving image, which records an instantaneous event which cannot be perceived by the human eye at a high frame rate, and is reproduced as slowly as it can be perceived by the human eye. Such image is often used to record a breaking state of a balloon. When a file property is a MOV format, and the number of frames recorded per sec is smaller than that to be reproduced per sec, the file type is expressed by "moving image¥interval moving image". An interval moving image is a moving image, which records an event which changes as slowly as it cannot be perceived by the human eye at a low frame rate, and is reproduced at a speed higher than an actual time so that the change can be perceived. Such image is often used to record plant growth.

The rating 206 is read by the CPU 101 from the attribute information of each image data, and the read value is stored.

A column 209 stores reduced image data, that is, binary image data for list display. Reduced image data of each image data is read and stored by the CPU 101.

Reference numerals 211, 212, and 213 respectively denote examples of rows, each of which stores information associated with one image data.

[UI Window]

The layout and functions of a UI window displayed by an image display processing application of this embodiment on the display 104 will be described below with reference to FIG. 3.

The UI window roughly includes an area 301 which hierarchically displays folders and year-month-day data in a tree, and an image list display area 302. The area 301 will be referred to as a tree view area hereinafter, and the area 302 will be referred to as a thumbnail area hereinafter.

Figure 3:
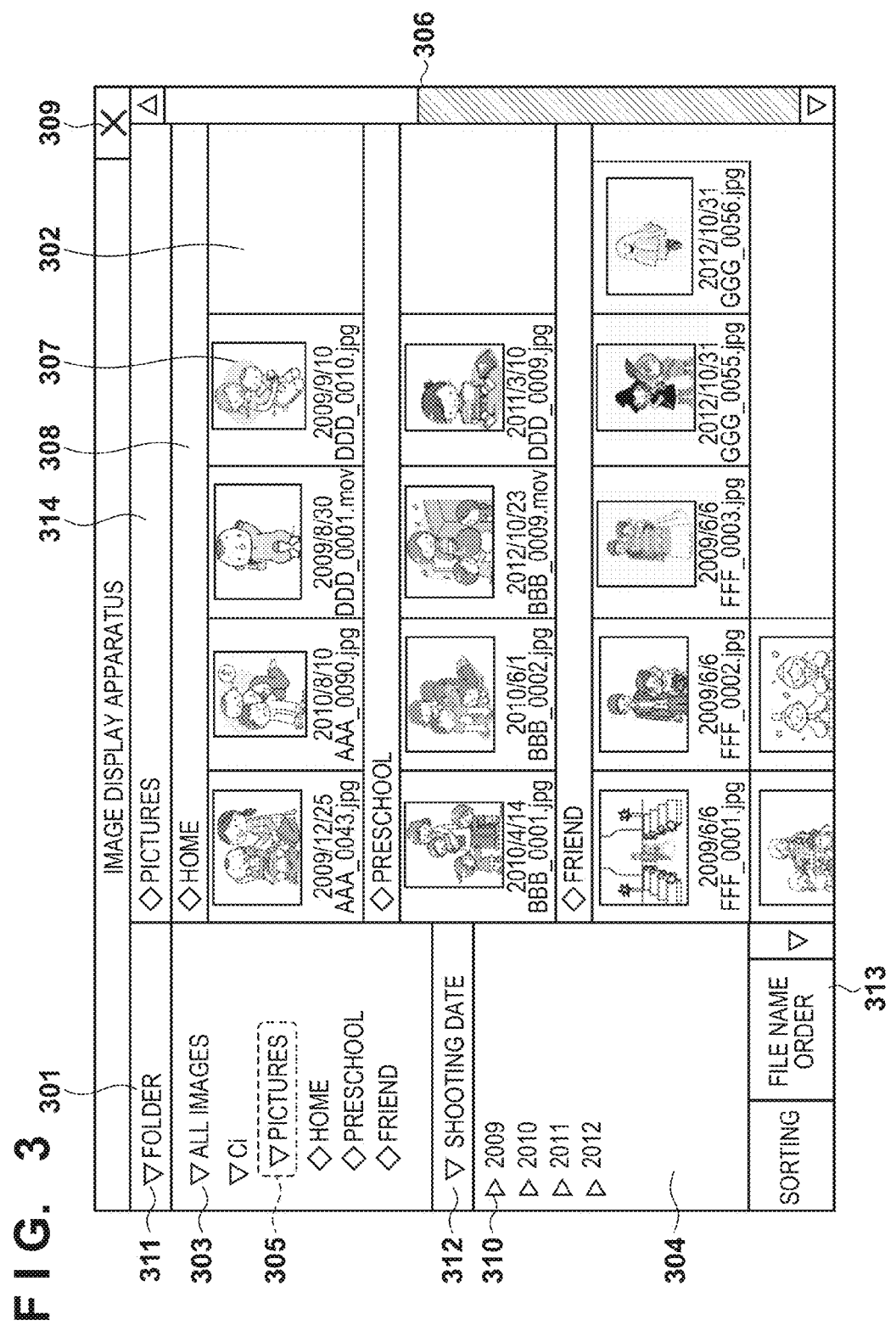

In FIG. 3, the tree view area 301 includes a folder tree 303 and shooting year-month-day tree 304. The folder tree 303 displays folders in a hierarchical tree pattern.

A method of forming the hierarchical tree pattern will be described below. The CPU 101 enumerates folders including image data in a character string order without any duplications using the information of the folder paths 203 in the DB. An enumeration result of the folder path information in the DB shown in FIG. 2 is as follows.

C:¥Picture¥home
C:¥Picture¥preschool
C:¥Picture¥friend

In this embodiment, since ¥ is a delimiter of a layer, the first layer is "C:". The second layer is "Picture". The third layer is "home", "preschool", or "friend". In this manner, the hierarchical tree pattern is formed.

The shooting year-month-day tree 304 displays shooting year-month-day data in a hierarchical tree pattern by the same method as in the folder tree 303.

Reference numeral 311 denotes a folder tree toggle button used to switch a display/non-display state of the folder tree 303. When the user presses the folder tree toggle button 311, the CPU 101 determines that the user makes a display/non-display switching operation of the folder tree. Then, when the folder tree 303 is displayed, the CPU 101 changes the button shape to a right-pointing arrow, and sets the contents of the tree in a non-display state. When the folder tree 303 is not displayed, the CPU 101 changes the button shape to a down-pointing arrow, and sets the contents of the tree in a display state.

Reference numeral 312 denotes a shooting year-month-day tree toggle button used to switch a display/non-display state of the shooting year-month-day tree 304. The shooting year-month-day tree toggle button 312 is used in the same manner as the folder tree toggle button 311, and switches a display/non-display state of the shooting year-month-day tree 304.

Reference numeral 305 denotes a focus frame. When the user presses a left button of a mouse on an arbitrary folder name or year-month-day character string in the folder tree 303 or shooting year-month-day tree 304, the CPU 101 determines than the user selects it, and displays the focus frame 305 that bounds the folder name or year-month-day. In the following description, folder or shooting year-month-day information selected by the user in the tree view area 301 will be referred to as a classification condition.

Reference numeral 310 denotes an arrow toggle button used to switch whether or not to display a lower layer. When the user presses the left button of the mouse on the arrow toggle button 310, the CPU 101 determines that the use inputs a switching instruction as to whether or not to display a lower layer. Then, when the user presses the left button in a non-display state of the lower layer, the CPU 101 changes the button shape to a down-pointing arrow and displays the lower layer. When the user presses the left button in a display state of the lower layer, the CPU 101 changes the button shape to a right-pointing arrow, and sets the lower layer in a non-display state.

Reference numeral 307 denotes a frame of an image corresponding no each individual image data. The CPU 101 loads reduced image data, a shooting date and time, and a fide name corresponding to each individual image data from the DB, and displays them on each frame of an image.

The thumbnail area 302 displays frames 307 of image data which match a folder or shooting year-month-day selected by the user on the tree view area 301. The CPU 101 loads matched image data from the DB and displays them. Furthermore, the CPU 101 displays die image data while grouping them in accordance with a determination result indicating whether or not to execute grouping, as will be described later.

Reference numeral 314 denotes a classification condition display bar indicating a classification condition. A character string within the focus frame 305 is displayed on the bar.

Reference numeral 308 denotes a group boundary bar indicating a boundary of a group. A character string used as a group name upon grouping image data is displayed on the bar.

Reference numeral 306 denotes a vertical scroll bar, that is, an operation member used to move a display area in the vertical direction. When not all image data which match a classification condition can be displayed in the thumbnail area 302, a display ratio is indicated by a tab. When the user drags and moves that tab using the pointing device or the like, the CPU 101 determines that a move operation of the display area in the thumbnail area 302 is detected, and moves the display area in the vertical direction.

Reference numeral 313 denotes a sorting order list box used to designate a sorting order of image data. When the user presses a down-arrow button of the sorting order list box 313, the CPU 101 determines that the user inputs a sorting order change instruction, and displays selection candidates or a sorting order in the list box 313. In this embodiment, assume that a file name order and shooting year-month-day order are enumerated. When the user presses the file name order, the CPU 101 determines that the user selects the file name order, sorts image data in the file name order, and displays the sorted data on the thumbnail area 302. When the user presses the shooting year-month-day order, the CPU 101 determines that the user selects the shooting year-month-day order, sorts image data in the shooting year-month-day order, and displays the sorted data on the thumbnail area 302. In the following description, a condition related to the sorting order will be referred to as a sort condition.

Reference numeral 309 denotes an end button. When the user presses the end button 309 using the pointing device or the like, the CPU 101 determines that the user inputs an end instruction, and ends image display processing (to be described later).

[Switching of Grouping According to Classification Condition and Sort Condition]

Image display processing of this embodiment will be described below with reference to FIGS. 4 to 7.

The correspondence relationship between classification condition types and sort conditions in the image display processing of this embodiment will be described first with reference to FIG. 5. A data table exemplified in FIG. 5 is generated by the CPU 101, and is stored in the HDD 105. The data table shown in FIG. 5 will be referred to as a classification condition-sort condition correspondence table hereinafter.

A column 501 stores a classification condition type.

A column 502 stores a sort condition corresponding to a given classification condition type.

Rows 503 to 507 indicate respective classification condition types and corresponding sort conditions. A use method of information in the rows 503 and 504 will be described later. A use method of information in the rows 505 to 507 will be described later in the second embodiment.

The correspondence relationship between classification conditions and grouping information in The image display processing of this embodiment will be described below with reference to FIG. 7. A data table exemplified in FIG. 7 is generated by the CPU 101 and is stored in the HDD 105. The data table shown in FIG. 7 will be referred to as a classification condition grouping information correspondence table hereinafter.

A column 701 stores detailed information of a classification condition.

A column 702 stores grouping information corresponding to information of a classification condition.

Each of rows 703 to 710 indicates a classification condition and corresponding grouping information. A user method of information in the rows 703 to 706 will be described later. A user method of information in the rows 707 to 710 will be described later in the second embodiment.

Processing for switching whether or not to execute grouping according to the classification condition and sort condition in the image display processing of this embodiment will be described below with reference to FIGS. 4, 5, and 7. Note that the processing shown in FIG. 4 is implemented when the CPU 101 expands an application program stored in the ROM 102 onto a work area of the RAM 103, and executes the expanded program.

Figure 4:
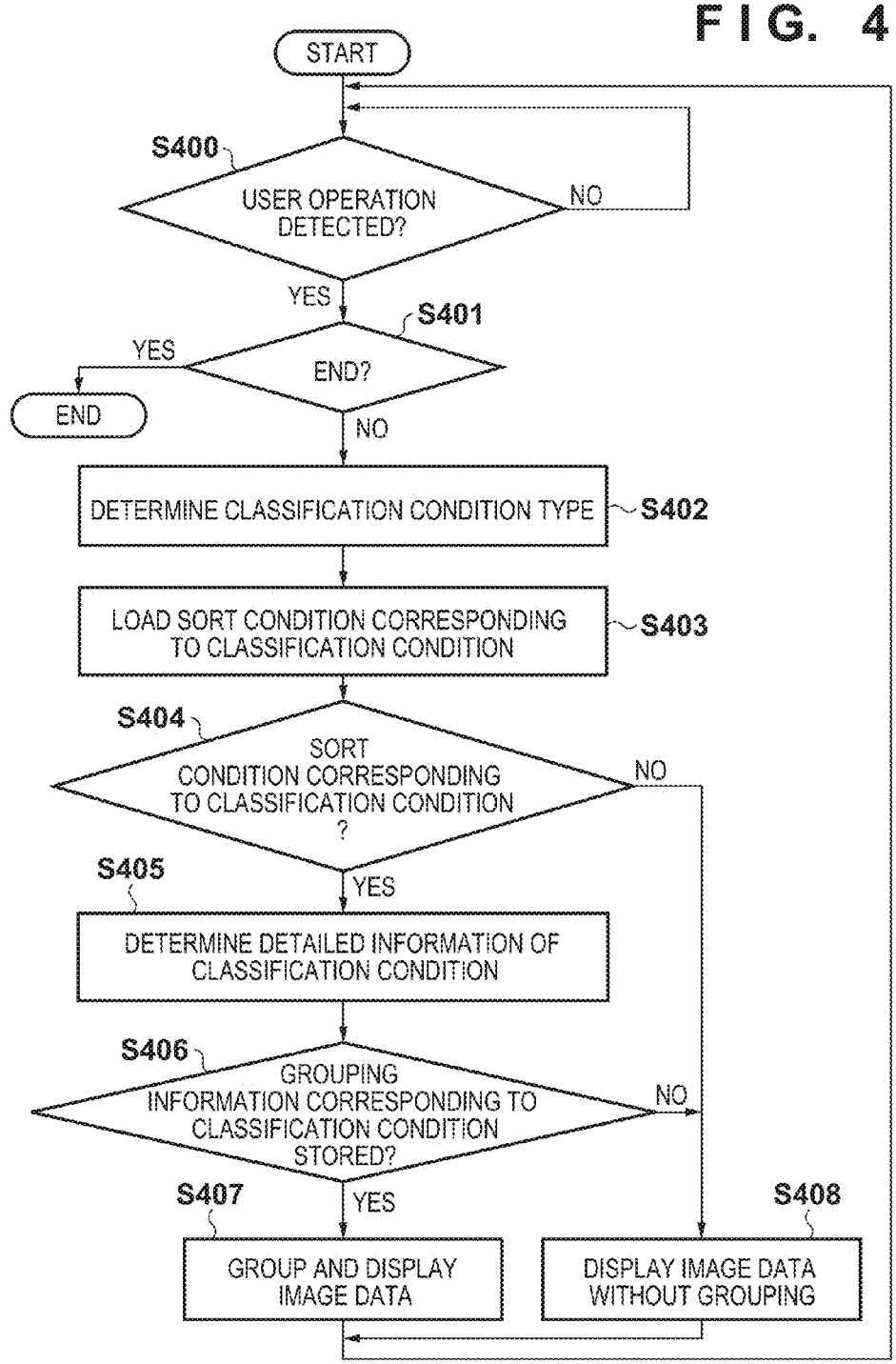
FIG. 4 is a flowchart showing the image display processing according to the embodiment.

Referring to FIG. 4, the CPU 101 determines in step S400 whether or not a user operation is detected. The user operation includes a switching operation of selected classification condition in the tree view area 301, and a change operation of the sort condition in the sorting order list box 313. If the CPU 101 determines that the user operation is detected, the process advances to step S401; otherwise, the process returns to step S400. Note that the user operation determined in this step includes that for selecting an arbitrary folder in the folder tree 303 and that for selecting an arbitrary shooting year-month-day in the shooting year-month-day tree 304 so as to specify an image to be displayed.

The CPU 101 determines in step S401 whether or not the user operation is an end instruction. A user's end instruction is pressing of the end button 309. If the CPU 101 determines that the user operation is an end instruction, this processing ends; otherwise, the process advances to step S402.

In step S402, the CPU 101 determines a classification condition type. When the user selects an arbitrary folder in the folder tree 303 in the tree view area 301, the CPU 101 determines that the classification condition type is "folder". A plurality of images stored in the selected folder are specified as targets to be displayed on the thumbnail area 302. On the other hand, when the user selects an arbitrary shooting year-month-day in the shooting year-month-day tree 304 in the tree view area 301, the CPU 101 determines that the classification condition type is "year-month-day". A plurality of images classified in a layer lower than the selected shooting year-month-day are specified as targets to be displayed on the thumbnail area 302.

In step S403, the CPU 101 loads a sort condition corresponding to the classification condition type determined in step S402 from the classification condition-sort condition correspondence table in FIG. 5 stored in the HDD 105 onto the RAM 103.

The CPU 101 determines in step S404 whether or not a sort condition designated by the user in the sorting order list box 313 matches that loaded in step S403. As a result of determination, if these conditions match, the process advances to step S405; otherwise, the process advances to step S408.

In step S405, the CPU 101 determines detailed information of the classification condition, and stores the determination result in the RAM 103. When the user selects an arbitrary folder in the folder tree 303 in the tree view area 301, the CPU 101 determines that the detailed information of the classification condition is "folder". When the user selects an arbitrary year in the shooting year-month-day tree 304 in the tree view area 301, the CPU 101 determines that the detailed information of the classification condition is "year of year-month-day". When the user selects an arbitrary month in the shooting year-month-day tree 304 in the tree view area 301, the CPU 101 determines that the detailed information of the classification condition is "month of year-month-day". When the user selects an arbitrary day in the shooting year-month-day tree 304 in the tree view area 301, the CPU 101 determines that the detailed information of the classification condition is "day of year-month-day".

The CPU 101 determines in step S406 whether or not the classification condition stored in step S405 is included in the classification condition-grouping information correspondence table in FIG. 7 stored in the HDD 105. As a result of determination, if the classification condition is included, the process advances to step S407; otherwise, the process advances to step S408.

In step S407, the CPU 101 groups and displays reduced images of image data corresponding to the classification condition. A method of grouping and displaying images will be described later with reference to FIG. 6.

In step S408, the CPU 101 displays reduced images of image data corresponding to the classification condition without grouping them. A method of displaying images without grouping them will be described later with reference to FIG. 8.

[Method of Grouping and Displaying Images]

The method of grouping and displaying images in step S407 in FIG. 4 will be described below with reference to FIGS. 6 and 7.

Figure 6:
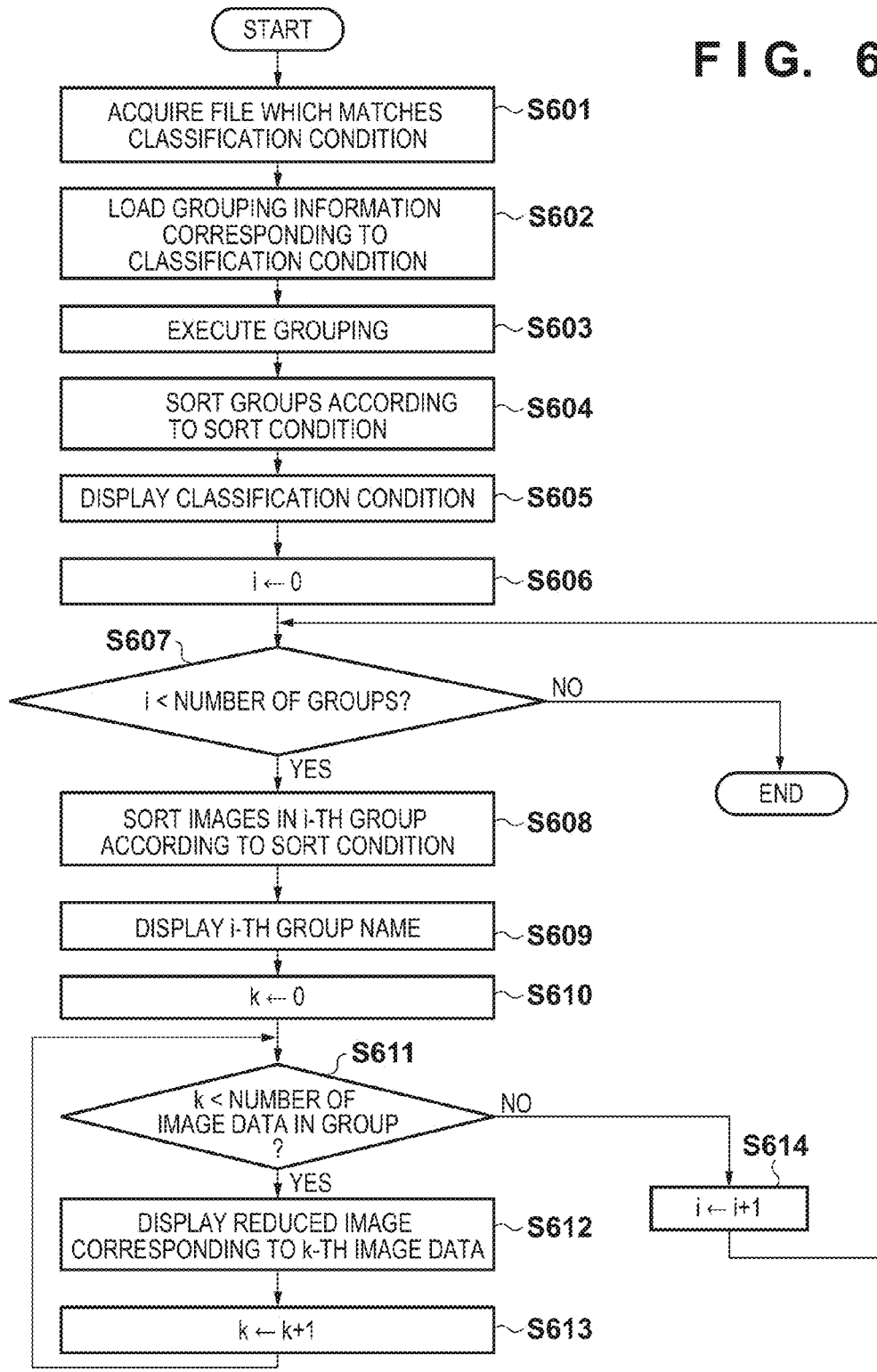
FIG. 6 is a flowchart showing an image display method in step S407 in FIG. 4.

Referring to FIG. 6, the CPU 101 searches the DB stored in the HDD 105 to acquire image data which match the classification condition designated by the user in step S601. For example, when the user specifies a "C:¥Pictures" folder to specify images to be displayed, the CPU 101 conducts a prefix search of C:¥Pictures¥ in association with information stored in the folder path column 203 of the DB to acquire matched image data and information associated with the image data. For example, when the user selects "December 2009" to specify images to be displayed, the CPU 101 conducts a prefix search of 2009¥12¥ in associate with information stored in shooting dates and times of the DB to acquire matched image data and information associated with the image data. Then, the CPU 101 holds the image data and associated information in the RAM 103.

In step S602, the CPU 101 loads grouping information corresponding to detailed information of the classification condition stored in she RAM 103 in step S405 from the classification condition-grouping information correspondence table of FIG. 7 stored in the HDD 105.

In step S603, the CPU 101 groups the image data held in the RAM 103 in step S601 based on the grouping information. When the grouping information is "month", the CPU 101 groups image data having the same shooting months into identical groups. When the grouping information is "folder immediately under which image file to be displayed is included", the CPU 101 groups image data having the same file paths into identical groups. Then, the CPU 101 holds the image data to be displayed in the RAM 103 in association with groups.

In step S604, the CPU 101 sorts a plurality of groups held in step S603 in accordance with the sort condition. When the sort condition is "shooting date and time" and a plurality of shooting month groups are held, the CPU 101 sorts these groups in turn from older to newer months. When the sort condition is "file name", and a plurality of folder groups are held, the CPU 101 sorts these groups in a character string order of folder paths.

In step S605, the CPU 101 displays a character string of the classification condition on the classification condition display bar 314. The character string of The classification condition is the same as that in the focus frame 305.

In step S606, the CPU 101 substitutes 0 in a counter i. The counter i is required for the CPU 101 to execute a series of processes from step S607 to step S614 to be described below for each individual target group.

The CPU 101 determines in step S607 whether or not the counter i is smaller than the number of target groups.

If the CPU 101 determines in step S607 that the counter i is smaller than the number of target groups, the process advances to step S608.

If the CPU 101 determines in step S607 that The counter i is not less than the number of target groups, it determines that a series of processes are complete for target groups, thus ending the processing.

In step S608, the CPU 101 sorts image data included in the i-th group in accordance with the sort condition. When the sort condition is "shooting date and time, the CPU 101 sorts image data in turn from older to newer shooting dates and times. When the sort condition is "file name", the CPU 101 sorts image data in a character string order of file names. If there are a plurality of image data whose order cannot be decided upon sorting the image data according to the sort condition in step S608, the CPU 101 sorts only these plurality of image data in a shooting date and time order. More specifically, when the sort condition "file name", and there are a plurality of image data having the same file name, the CPU 101 compares shooting dates and times of the image data having the same file name, and displays image data having an older shooting date and time before that having a newer shooting date and time. This is because the shooting dates and times rarely match even in seconds. If the shooting dates and times also match, the CPU 101 displays image data in an order they are recorded in the HDD 105.

In step S609, the CPU 101 displays the i-th group name on the group boundary bar 308 in FIG. 3. As the group name, information in the DB corresponding to the grouping information is used. When the grouping information is a month, the CPU 101 displays a shooting month as the group name. When the grouping information is "folder immediately under which image file to be displayed is included", the CPU 101 displays a name of a folder including that image file as the group name. The same applies to the case in which the grouping information is "day" and "hour". Note that "hour" indicates "hour" of "hour-min-sec".

In step S610, the CPU 101 substitutes 0 in a counter k. The counter k is required for the CPU 101 to execute a series of processes from step S611 to step S613 to be described below for each individual target image data.

The CPU 101 determines in step S611 whether or not the counter k is smaller than the number of target image data.

If the CPU 101 determines in step S611 that the counter k is smaller than the number of target image data, the process advances to step S612.

If the CPU 101 determines in step S611 that the counter k is not less than the number of target image data, it determines that a series of processes for the target image data are complete, and the process advances to step S614.

In step S612, the CPU 101 displays a reduced image corresponding to the k-th image data of the i-th group. The aforementioned reduced image data is the reduced image data 209 loaded in association with the image-data in step S601.

In step S613, the CPU 101 increments the counter k, and the process returns to step S611.

In step S614, the CPU 101 increments the counter i, and the process returns to step S607.

[Method of Displaying Images without Grouping]

The method of displaying images without grouping them in step S408 in FIG. 4 will be described below with reference to FIG. 8. Note that in the description of FIG. 8, the same step numbers as in FIG. 6 denote the same processes as in FIG. 6, and a description Thereof will not be repeated.

Figure 8:
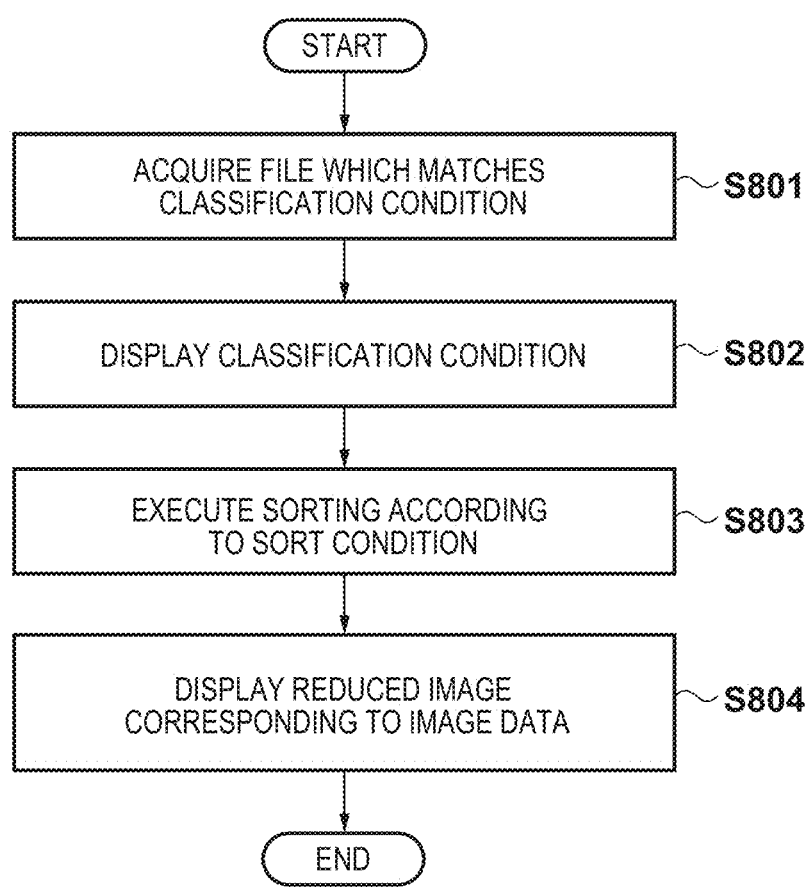
FIG. 8 is a flowchart showing an image display method in step S408 in FIG. 4.

Referring to FIG. 8, in step S801, the CPU 101 searches the DB stored in the HDD 105 based on a user operation required to specify images to be displayed to acquire a plurality of image data to be displayed as in step S601 in FIG. 6.

In step S802, the CPU 101 displays a character string of the classification condition on the classification condition display bar 314 as in step S606 in FIG. 6.

In step S803, the CPU 101 sorts the image data acquired in step S801 according to the sort condition as in step S608 in FIG. 6.

In step S804, the CPU 101 displays reduced images corresponding to the image data. The aforementioned reduced image data are the reduced image data 209 loaded in association with the image data in step S801.

[Method of Grouping and Displaying Images When Classification Condition=Folder/Sort Condition=File Name]

An image display method when the user designates an arbitrary folder as the classification condition and a file name as the sort condition will be described below with reference to FIGS. 2, 4, 6, and 7. Prior to the description, assume that the current state is that immediately after the user selects a Pictures folder on the folder tree 303.

The CPU 101 determines in step S400 whether or not a user operation is detected. Since the current state is that immediately after the user selects the Pictures folder, the CPU 101 determines chat a user operation is detected, and the process advances to step S401.

The CPU 101 determines in step S401 whether or not the user operation is an end instruction. Since the user operation is selection of the classification condition, the CPU 101 determines thou the user operation is not an end instruction, and the process advances to step S402.

In step S402, the CPU 101 determines a classification condition type. Since the user selects the Pictures folder on the folder tree 303, the CPU 101 determines that the classification condition type is "folder".

In step S403, the CPU 101 loads a sort condition corresponding to the classification condition type determined in step S402 from the classification condition-sort condition correspondence table in FIG. 5 stored in the HDD 105. Since the classification condition type is "folder", the CPU 101 loads "file name" as the sort condition with reference to the row 503.

The CPU 101 determines in step S404 whether or not the sort condition designated in the sorting order list box 313 by the user matches that loaded in step S403. Since the sort condition designated by the user is "file name", the CPU 101 determines that the two conditions match, and the process advances to step S405.

In step S405, the CPU 101 determines detailed information of the classification condition, and stores the determination result in the RAM 103. Since the user selects the Pictures folder on the folder tree 303, the CPU 101 determines that the detailed information of the classification condition is "folder".

The CPU 101 determines in step S406 whether or not the classification condition stored in step S405 is included in the classification condition-grouping information correspondence table of FIG. 7 stored in the HDD 105. Since the classification condition-grouping information correspondence table includes "folder", the process advances to step S407.

In step S407, the CPU 101 groups and displays reduced images of image data corresponding to the classification condition. Details of the process in step S407 will be described below with reference to FIG. 6.

In step S601, the CPU 101 searches the DB stored in the HDD 105 to acquire image data which match the classification condition designated by the user. Since the classification condition is the C:¥Pictures folder, the CPU 101 conducts a prefix search of C:¥Pictures¥ in association with information stored in the folder path column 203 of the DB to acquire matched image data and information associated with the image data. Then, the CPU 101 holds the image data and information in the RAM 103.

In step S602, the CPU 101 loads grouping information corresponding to the detailed information of the classification condition stored in step S405 from the classification condition-grouping information correspondence sable of FIG. 7 stored in the HDD 105. Since the detailed information of the classification condition stored in step S405 is "folder", the CPU 101 loads grouping information with reference to the row 706. The grouping information is "folder immediately under which image file to be displayed is included".

In step S603, the CPU 101 groups the image data held in the RAM 103 in step S601 based on the grouping information. Since the grouping information is "folder immediately under which image file to be displayed is included", the CPU 101 groups image data having the same file paths into identical groups. Then, the CPU 101 holds the target image data in the RAM 103 in association with the groups. In this embodiment, assume that the number of groups is three, and the number of image data included in each of the first and second groups is four, and the number of image data included in the third group is seven.

In step S604, the CPU 101 sorts the plurality of groups held in step S603 according to the sort condition. Since the sort condition is "file name", the CPU 101 sorts the groups in a character string order of folder paths.

In step S605, the CPU 101 displays a character string of the classification condition on the classification condition display bar 314. The character string of the classification condition is the same as that in the focus frame 305. Since the classification condition selected by the user is the Pictures folder, the CPU 101 displays "Pictures".

In step S606, the CPU 101 substitutes 0 in the counter i.

The CPU 101 determines in step S607 whether or not the counter i is smaller than the number of target groups. Since the counter i=0 and the number of groups=3, the CPU 101 determines that the counter i is smaller than the number of groups, and the process advances to step S608.

In step S608, the CPU 101 sorts image data included in the 0th group according to the sort condition. Since the sort condition is "file name", the CPU 101 sorts image data in a character string order of file names.

In step S609, the CPU 101 displays the 0th group name on the group boundary bar 308. As the group name, information in the DB corresponding to the grouping information is used. Since the grouping information is "folder immediately under which image file to be displayed is included", the CPU 101 displays a name of a folder which includes an image data as the group name. When the target data is data in the row 211 of FIG. 2, since a folder including AAA_043.jpg is "home", the group name is "home".

In step S610, the CPU 101 substitutes 0 in the counter k.

The CPU 101 determines in step S611 whether or not the counter k is smaller than the number of target image data. Since the counter k=0 and the number of image data in the 0th group is four, the CPU 101 determines that the counter k is smaller than the number of target image data, and the process advances to step S612.

In step S612, she CPU 101 displays a reduced image corresponding to the 0th image data of the 0th group.

In step S613, the CPU 101 increments the counter k, and the process returns to step S611.

In step S614, the CPU 101 increments the counter i, and the process returns to step S607.

The CPU 101 repeats the aforementioned processes for each group in correspondence with the number of target groups, and repeats the aforementioned processes for each image data in correspondence with the number of target images, thus ending the display processing.

FIG. 3 shows an example of a display processing result UI window when the user selects "Pictures" on the folder tree 303 so as to specify images to be displayed.

[Method of Displaying Images without Grouping when Classification Condition=Folder/Sort Condition=Shooting Date and Time]

When the user searches an arbitrary folder for image data of a desired shooting year-month-day, he or she generally selects the arbitrary folder and makes an operation for changing a sorting order to "shooting date and time". In an information processing apparatus with a search function, the user may often make an operation for inputting conditions such as a specific folder name and shooting year-month-day, and then conducting an AND search. However, since it is troublesome for the user to input a plurality of conditions from an input device such as a keyboard, the user generally makes an operation for selecting a folder and changing a sorting order.

An image display method when the user selects an arbitrary folder and changes a sorting order to a shooting date and time order will be described below with reference to FIGS. 4 and 8. Prior to the description, assume that the current state is that immediately after the user selects a shooting date and time order in the sorting order list box 313 after he or she selects a Pictures folder on the folder tree 303.

The CPU 101 determines in step S400 whether or not a user operation is detected. Since the current state is that immediately after the user selects the shooting date and time order, the CPU 101 determines that a user operation is detected, and the process advances to step S401.

The CPU 101 determines in step S401 whether or not the user operation is an end instruction. Since the user operation is the change instruction of the sort condition, the CPU 101 determines that the user operation is not an end instruction, and the process advances to step S402.

In step S402, the CPU 101 determines a classification condition type. Since the user selects the Pictures folder on the folder tree 303, the CPU 101 determines that the classification condition type is "folder".

In step S403, the CPU 101 loads, onto the RAM 103, a sort condition corresponding to the classification condition type determined in step S402 from the classification condition-sort condition correspondence table in FIG. 5 stored in the HDD 105. Since the classification condition type is "folder", the CPU 101 loads "file name" as the sort condition with reference to the row 503.

The CPU 101 determines in step S404 whether or not the sort condition designated in the sorting order list box 313 by the user matches that loaded in step S403. Since the sort condition designated in the sorting order list box 313 by the user is the shooting date and time order, and the sort condition loaded in step S403 is "file name", the CPU 101 determines that The two conditions do not match, and the process advances to step S408.

In step S408, the CPU 101 displays reduced images of image data corresponding to the classification condition without grouping them. Details of the process in step S408 will be described below with reference to FIG. 8.

In step S801, the CPU 101 searches the DE stored in the HDD 105 to acquire image data which match the classification condition designated by the user. Since the classification condition is the C:¥Pictures folder, the CPU 101 conducts a prefix search of C:¥Pictures¥ in association with information stored in the folder path column 203 of the DB to acquire matched image data and information associated with the image data. Then, the CPU 101 holds the image data and information in the RAM 10.

In step S802, the CPU 101 displays a character string of the classification condition on the classification condition display bar 314. Since the classification condition selected by the user is the Pictures fodder, the CPU 101 displays "Pictures".

In step S803, the CPU 101 sorts the image data acquired in step S801 in accordance with the sort condition. Since, the sort condition is "shooting date and time", the CPU 101 sorts image data in turn from older to newer shooting dates and times.

In step S804, the CPU 101 displays reduced images corresponding to the image data.

Figure 9:
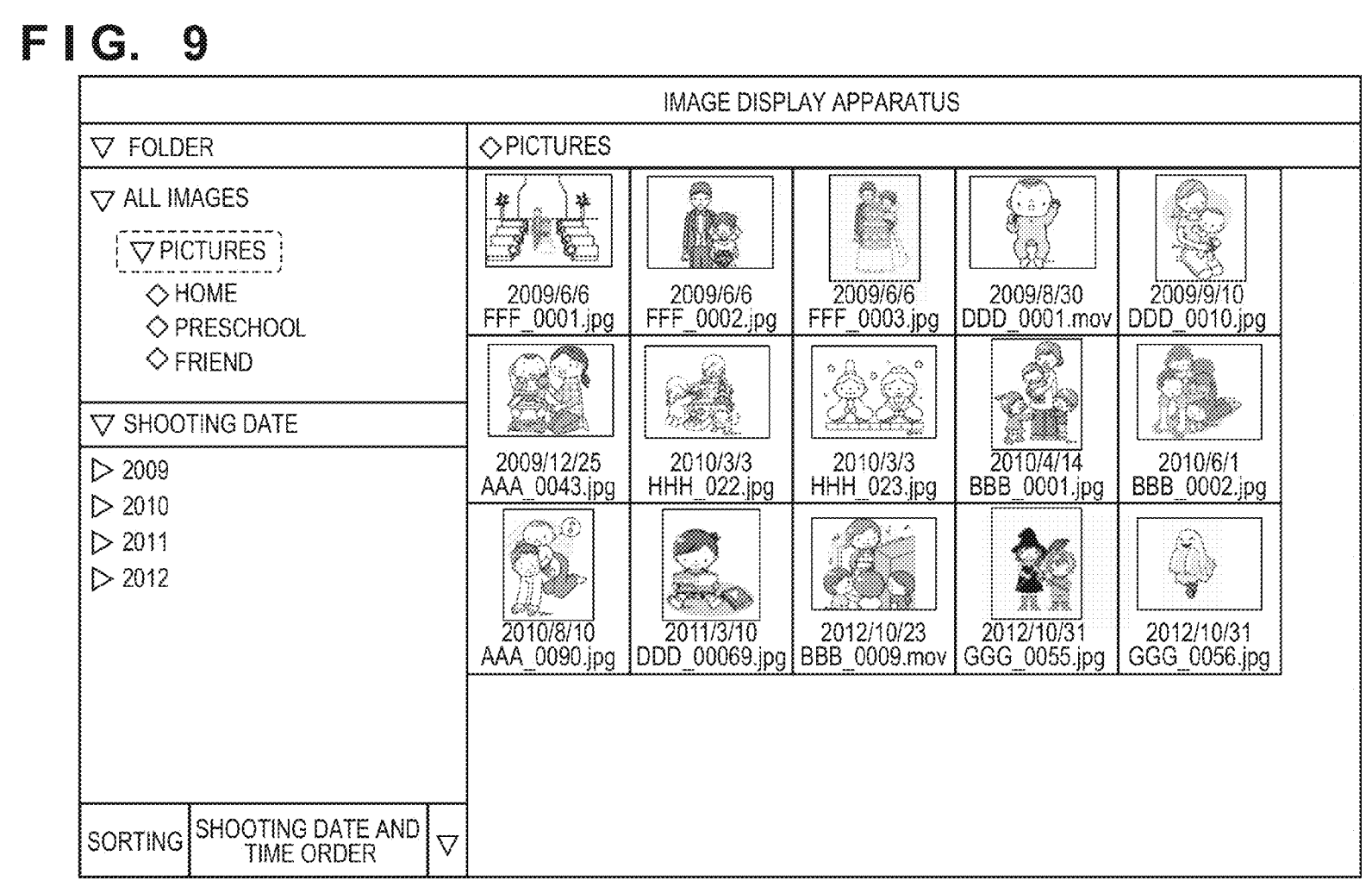

FIG. 9 shows an example of a display processing result UI window when the user selects "Pictures" on the folder tree so as to specify images to be displayed.

[Method of Grouping And Displaying Images When Classification Condition=Shooting Year/Sort Condition=Shooting Date and Time]

An image display method when the user designates an arbitrary shooting year as the classification condition and a shooting date and time as the sort condition will be described below with reference to FIGS. 2, 4, 6, and 7. Prior to the description, assume that the current state is that immediately after the user selects "2009" on the shooting year-month-day tree 304.

The CPU 101 determines in step S400 whether or not a user operation is detected. Since the current state is that immediately after the user selects "2009", the CPU 101 determines that a user operation is detected, and the process advances to step S401.

The CPU 101 determines in step S401 whether or not the user operation is an end instruction. Since the user operation is selection of the classification condition, the CPU 101 determines that the user operation is not an end instruction, and the process advances to step S402.

In step S402, the CPU 101 determines a classification condition type. Since the user selects "2009" on the shooting year-month-day tree 304, the CPU 101 determines that the classification condition type is "shooting year-month-day".

In step S403, the CPU 101 loads a sort condition corresponding to the classification condition type determined in step S402 from the classification condition-sort condition correspondence table in FIG. 5 stored in the HDD 105. Since the classification condition type is "shooting year-month-day", the CPU 101 loads "shooting date and time" as the sort condition with reference to the row 504.

The CPU 101 determines in step S404 whether or not the sort condition designated in the sorting order list box 313 by the user matches that loaded in step S403. Since the sort condition designated by the user is "shooting date and time", the CPU 101 determines that the two conditions match, and the process advances to step S405.

In step S405, the CPU 101 determines detailed information of the classification condition, and stores the determination result in the RAM 103. Since the user selects "2009" on the shooting year-month-day tree 304, the CPU 101 determines that the detailed information of the classification condition is "year" of "year-month-day".

The CPU 101 determines in step S406 whether or not the classification condition stored in step S405 is included in the classification condition-grouping information correspondence table of FIG. 7 stored in the HDD 105. Since the classification condition-grouping information correspondence table includes "year" of "yeas-month-day", the process advances to step S407.

In step S407, the CPU 101 groups and displays reduced images of image data corresponding to the classification condition. Details of the process in step S407 will be described below with reference to FIG. 6.

In step S601, the CPU 101 searches the DB stored in the HDD 105 to acquire image data which match the classification condition designated by the user. Since the classification condition is "2009", the CPU 101 conducts a prefix search of 2009¥ in association with information stored in the shooting date and time column 205 of the DB to acquire matched image data and information associated with the image data. Then, the CPU 101 holds the image data and information in the RAM 103.

In step S602, the CPU 101 loads grouping information corresponding to the detailed information of the classification condition stored in step S405 from the classification condition-grouping information correspondence table of FIG. 7 stored in the HDD 105. Since the detailed information of the classification condition stored in step S405 is "year of year-month-day", the CPU 101 loads grouping information with reference to the row 703. The grouping information is "month".

In step S603, the CPU 101 groups the image data held in the RAM 103 in step S601 based on the grouping information. Since the grouping information is "month", the CPU 101 groups image data having the same shooting months into identical groups. Then, the CPU 101 holds the target image data in the RAM 103 in association with the groups. In this embodiment, assume that the number of groups is four, and the number of image data included in the first group is 3, and the number of image data included in each of the second, third, and fourth groups is one.

In step S604, the CPU 101 sorts the plurality of groups held in step S603 according to the sort condition. Since the sort condition is "shooting date and time", the CPU 101 sorts the groups in turn from older to newer months.

In step S605, the CPU 101 displays a character string of the classification condition on the classification condition display bar 314. The character string of the classification condition is the same as that in the focus frame 305. Since the classification condition selected by the user is "2009", the CPU 101 displays "2009".

In step S606, the CPU 101 substitutes 0 in the counter i.

The CPU 101 determines in step S607 whether or not the counter i is smaller than the number of target groups. Since the counter i=0 and the number of groups=4, the CPU 101 determines that the counter is smaller than the number of groups, and the process advances to step S608.

In step S608, the CPU 101 sorts image data included in the 0th group according to the sort condition. Since the sort condition is "shooting date and time", the CPU 101 sorts image data in turn from older to newer shooting dates and times.

In step S609, the CPU 101 displays the 0th group name on the group boundary bar 308 in FIG. 3. As the group name, information in the DB corresponding to The grouping information is used. Since the grouping information is "month", the CPU 101 displays a shooting month as the group name.

When the target data is data in the row 211 of FIG. 2, since a shooting month is December, the group name is "December".

In step S610, the CPU 101 substitutes 0 in the counter k.

The CPU 101 determines in step S611 whether or not the counter k is smaller than the number of target image data. Since the counter k=0 and the number of image data in the 0th group is three, the CPU 101 determines that the counter k is smaller than the number of target image data, and the process advances to step S612.

In step S612, the CPU 101 displays a reduced image corresponding to the 0th image data of the 0th group.

In step S613, the CPU 101 increments the counter k, and the process returns to step S611.

In step S614, the CPU 101 increments the counter i, and the process returns to step S607.

The CPU 101 repeats the aforementioned processes for each group in correspondence with the number of target groups, and repeats the aforementioned processes for each image data in correspondence with the number of target images, thus ending the display processing.

Figure 10:
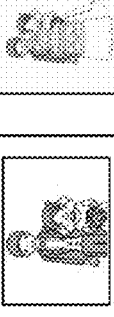
FIG. 10 is a view showing an example of a UI window displayed by image display processing according to the first embodiment.

FIG. 10 shows an example of a display processing result UT window when the user selects "2009" on the shooting year-month-day tree so as to specify images to be displayed.

[Method of Displaying Images without Grouping when Classification Condition=Shooting Year/Sort Condition=File Name]

When the user searches image data of an arbitrary shooting year for those having desired file names, he or she often generally makes an operation for selecting an arbitrary shooting year, and changing a sorting order to an order of file names. Such operation is made based on the same reason as that when the classification condition is "folder" and the sort condition is "shooting date and time".

An image display method when the user selects an arbitrary shooting year and changes a sorting order to a file name order will be described below with reference to FIGS. 4 and 8. Prior to the description, assume that the current state is that immediately after the user selects a file name order in the sorting order list box 313 after he or she selects "2009" on the shooting year-month-day tree 304.

The CPU 101 determines in step S400 whether or not a user operation is detected. Since the current state is that immediately after the user selects the file name order, the CPU 101 determines that a user operation is detected, and the process advances to step S401.

The CPU 101 determines in step S401 whether or not the user operation is an end instruction. Since the user operation is the change instruction of the sort condition, the CPU 101 determines that the user operation is not an end instruction, and the process advances to step S402.

In step S402, the CPU 101 determines a classification condition type. Since the user selects "2009" on the shooting year-month-day tree 304, the CPU 101 determines that the classification condition type is "shooting year-month-day".

In step S403, the CPU 101 loads, onto the RAM 103, a sort condition corresponding to the classification condition type determined in step S402 from the classification condition-sort condition correspondence table in FIG. 5 stored in the HDD 105. Since the classification condition type is "shooting year-month-day", the CPU 101 loads "shooting date and time" as the sort condition with reference to the row 504.

The CPU 101 determines in step S404 whether or not the sort condition designated in the sorting order list box 313 by the user matches that loaded in step S403. Since the sort condition designated in the sorting order list box 313 by the user is the file name order, and the sort condition loaded in step S403 is "shooting date and time", the CPU 101 determines that the two conditions do not match, and the process advances to step S408.

In step S408, the CPU 101 displays reduced images of image data corresponding to the classification condition without grouping them. Details of the process in step S408 will be described below with reference no FIG. 8.

In step S801, the CPU 101 searches the DB stored in the HDD 105 to acquire image data which match the classification condition designated by the user. Since the classification condition is "2009", the CPU 101 conducts a prefix search of 2009¥ in association with information stored in the shooting data and time column 205 of the DB to acquire matched image data and information associated with the image data. Then, the CPU 101 holds the image data and information in the RAM 103.

In step S802, the CPU 101 displays a character string of the classification condition on the classification condition display bar 314. Since The classification condition selected by the user is "2009", The CPU 101 displays "2009".

In step S803, the CPU 101 sorts the image data acquired in step S801 in accordance with the sort condition. Since the sort condition is "file name", the CPU 101 sorts image data in a character string order of file names.

In step S804, the CPU 101 displays reduced images corresponding to the image data.

FIG. 11 shows an example of a display processing result UI window when the user selects "2009" on the shooting year-month-day tree so as to specify images to be displayed.

[Method of Grouping and Displaying Images When Classification Condition=Shooting Month/Sort Condition=Shooting Date and Time]

An image display method when the user designates an arbitrary shooting month as the classification condition and a shooting date and time as the sort condition will be described below with reference to FIGS. 2, 4, 6, and 7. Prior to the description, assume that the current state is that immediately after the user selects "October 2012" on the shooting year-month-day tree 304.

Note that a description of steps corresponding to the same processes as those when the classification condition is "shooting year" and the sort condition is "shooting date and time" will not be repeated.

The processes of steps S400 and S401 are the same as those in the case of the shooting year.

In step S402, the CPU 101 determines a classification condition type. Since the user selects "October 2012" on the shooting year-month-day tree 304, the CPU 101 determines that the classification condition type is "shooting year-month-day".

The process of step S403 is the same as that in the case of the shooting year.

In step S405, the CPU 101 determines detailed information of the classification condition, and stores the determination result in the RAM 103. Since the user selects "October 2012" on the shooting year-month-day tree 304, the CPU 101 determines that the detailed information of the classification condition is "month of year-month-day".

The CPU 101 determines in step S406 whether or not the classification condition stored in step S405 is included in the classification condition-grouping information correspondence table of FIG. 7 stored in the HDD 105. Since the classification condition-grouping information correspondence table includes "month of year-month-day", the process advances to step S407.

In step S107, the CPU 101 groups and displays reduced images of image data corresponding to The classification condition. Details of the process in step S407 will be described below with reference to FIG. 6.

In step S601, the CPU 101 searches the DE stored in the HDD 105 to acquire image data which match the classification condition designated by the user. Since the classification condition is "October 2012", the CPU 101 conducts a prefix search of 2012¥10¥ in association with information stored in the shooting date and time column 205 of the DE to acquire matched image data and information associated with the image data. Then, the CPU 101 holds the image data and information in the RAM 103.

In step S602, the CPU 101 loads grouping information corresponding to the detailed information of the classification condition stored in step S405 from the classification condition-grouping information correspondence table of FIG. 7 stored in the HDD 105. Since the detailed information of the classification condition stored in step S405 is "month of year-month-day", the CPU 101 loads grouping information with reference to the row 704. The grouping information is "day".

In step S603, the CPU 101 groups the image data held in the RAM 103 in step S601 based on the grouping information. Since the grouping information is "day", the CPU 101 groups image data having the same shooting day into identical groups. Then, the CPU 101 holds the target image data in the RAM 103 in association with the groups. In this embodiment, assume that the number of groups is two, and the number of image data included in the first group is one, and the number of image data included in the second group is two.

In step S604, the CPU 101 sorts the plurality of groups held in step S603 according to the sort condition. Since the sort condition is "shooting date and time", the CPU 101 sorts the groups in turn from older to newer days.

In step S605, the CPU 101 displays a character string of the classification condition on the classification condition display bar 314. The character string of the classification condition is the same as that in the focus frame 305. Since the classification condition selected by the user is "October 2012", the CPU 101 displays "October".

In step S606, the CPU 101 substitutes 0 in the counter i.

The CPU 101 determines in step S607 whether or not the counter i is smaller than the number of target groups. Since the counter i=0 and the number of groups=2, the CPU 101 determines that the counter i is smaller than the number of groups, and the process advances to step S608.

In step S608, the CPU 101 sorts image data included, in the 0th group according to the sort condition. Since the sort condition is "shooting date and time", the CPU 101 sorts image data in turn from older to newer shooting dates and times.

In step S609, the CPU 101 displays the 0th group name on the group boundary bar 308. As the group name, information in the DB corresponding to the grouping information is used. Since the crooning information is "day", the CPU 101 displays a shooting day as the group name. When the target data is data in the row 213 of FIG. 2, since a shooting day is the 23rd day, the group name is "23".

In step S610, the CPU 101 substitutes 0 in the counter k.

The CPU 101 determines in step S611 whether or not the counter k is smaller than the number of target image data. Since the counter k=0 and the number of image data in the 0th group is one, the CPU 101 determines that the counter k is smaller than the number of target image data, and the process advances to step S612.

The processes of steps S612, S613, and S614 are the same as those in the case of the shooting year.

The CPU 101 repeats the aforementioned processes for each group in correspondence with the number of target groups, and repeats the aforementioned processes for each image data in correspondence with the number of target images, thus ending the display processing.

FIG. 12 shows an example of a display processing result UI window when the user selects "October 2012" on the shooting year-month-day tree so as so specify images to be displayed.

Note that in this embodiment, the classification condition-grouping information correspondence table of FIG. 7 is used to decide a grouping unit in step S602. Alternatively, information one layer below the classification condition selected by the user may be used for grouping. In this case, the CPU 101 determines in step S406 whether or not the lowermost layer is selected. If the lowermost layer is selected, the process advances to step S408; otherwise, the process advances to step S407. In this manner, the need for the grouping information correspondence table can be obviated.

In this embodiment, when the classification condition is "folder", the corresponding grouping information in the classification condition-grouping information correspondence table of FIG. 7 is "folder immediately under which image file to be displayed is included". Alternatively, grouping may be executed using a sub-folder immediately under the folder designated as the classification condition. In this case, the user can recognize locations of most of files.

In this embodiment, image data are sorted in ascending order for all the sort conditions. However, image data may be sorted in descending order. Furthermore, the user may be allowed to select ascending or descending order using an operation member such as a radio button. When the user is allowed to select ascending or descending order, the CPU 101 stores information selected by the user using the operation member in the HDD 105, and switches ascending or descending order in steps S608 and S803 according to that information.

In this embodiment, when there are a plurality of image data whose order cannot be decided in steps S608 and S803, they are sorted in a shooting date and time order. Alternatively, such image data may be sorted in a file path order. This is because no redundant file paths are normally set.

In this embodiment, upon grouping for each folder, a folder name is used as the group name. Alternatively, a folder path may be displayed. When the folder name is used, a plurality of identical folder names may be used, but no redundant folder paths are set.

As described above, according to this embodiment, when the user searches an arbitrary folder for images of a desired shooting date and time, if he or she selects "shooting date and time" as the sort condition, the grouping is canceled, and images are aligned in a shooting date and time order. Hence, since the user can easily estimate locations of desired images from those before and after them, and images are displayed as groups, he or she can easily find images of the desired shooting date and time. On the other hand, when the user wants to browse images in a file name order in an arbitrary folder, since images are displayed while being grouped for respective folders, the conventional convenience is also maintained.

Also, according to this embodiment, when the user searches images of an arbitrary shooting year for an image of a desired file name, if "file, name" is selected as the sort condition, grouping is canceled, and images are aligned in a file name order. Hence, since the user can easily estimate a location of the desired image from those before and after it, and images are displayed as groups, he or she can easily find the image of the desired file name. On the other hand, when the user wants to browse images in a shooting date and time order in an arbitrary shooting year, since images are displayed while being grouped for respective months, he or she easily understands divisions of months, and the conventional convenience is also maintained.

Furthermore, according to this embodiment, when the user selects a desired shooting year-month-day, and when the sort condition is a shooting date and time order, since granularities of groups change depending on layers, he or she can recognize a shooting year-month-day of image data at a glance.

[Second Embodiment]

The first embodiment has exemplified the case in which the classification condition is "shooting year-month-day" or "folder", and the sort condition is a file name order or shooting date and time order. By contrast, the second embodiment will exemplify a case in which the classification condition is "rating", "file type", or "shooting location", and the sort condition is "rating", "extension", or "place-name".

Note that the configuration of an information processing apparatus of this embodiment is the same as that in the first embodiment, and a description thereof will be omitted.

The layout and functions of a UI window displayed by an image display processing application of this embodiment on a display 104 will be described first with reference to FIG. 13. Note that in FIG. 13, only operation members different from FIG. 3 will be explained, and a description of the same operation members will be omitted.

Figure 13:
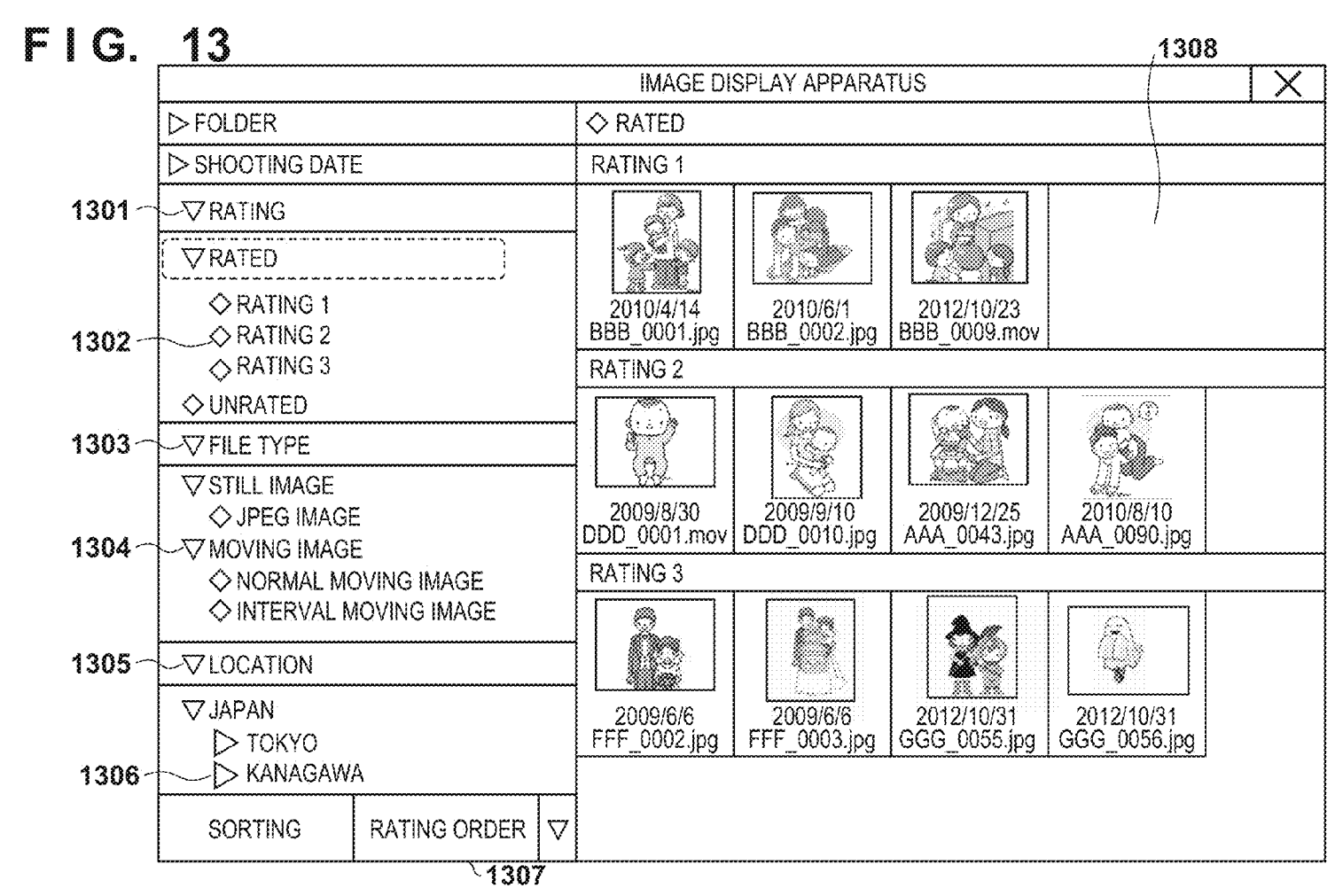

In FIG. 13, reference numeral 1302 denotes a rating tree. On the rating tree 1302, ratings are displayed in a hierarchical tree form. A CPU 101 loads information of a rating column 206 in a DB, and determines "rated" or "unrated". When a rating value is "0", the CPU 101 determines "unrated". When a rating value is not less than "1", the CPU 101 determines "rated". "Rated"/"unrated" are displayed as the first layer of the rating tree 1302, and numeric values not less than 1 are displayed as the second aver.

Reference numeral 1304 denotes a file type tree. On the file type tree 1304, file types are displayed in a hierarchical tree form.

Reference numeral 1306 denotes a shooting location tree. On the shooting location tree 1306, place-names as shooting locations are displayed in a hierarchical tree form. The shooting locations are hierarchically displayed using place-names of countries, prefectures, and cities.

The generation method of tree structures displayed on the file type tree 1304 and shooting location tree 1306 are the same as that described in association with the folder tree 303 in FIG. 3.

Reference numeral 1301 denotes a rating tree toggle button used to switch a display/non-display state of the rating tree 1302.

Reference numeral 1303 denotes a file type tree toggle button used to switch a display/non-display state of the file type tree 1304.

Reference numeral 1305 denotes a shooting location tree toggle button used to switch a display/non-display state of the shooting location tree 1306.

The rating tree toggle button 1301, file type tree toggle button 1303, and shooting location tree toggle button 1305 are operation members which operate in the same manner as the folder tree toggle button 311 of FIG. 3 by a user operation.

Reference numeral 1307 denotes a sorting order list box used to designate a sorting order of image data. An operation when this box is operated by the user is the same as that of the sorting order list box 313 of FIG. 3. Unlike in the sorting order list box 313, a rating order, file extension order, and place-name order are added as sorting orders to be enumerated as selection candidates. When the user presses a rating order, the CPU 101 determines that the rating order is selected, sorts image data in the rating order, and displays the sorted image data on a thumbnail area 1308. The same applies to the file extension order and place-name order.

[Method of Grouping and Displaying Images When Classification Condition=Rating/Sort Condition=Rating Order]

An image display method when the user designates "rating" as the classification condition and a rating order as the sort condition will be described below with reference to FIGS. 2, 4, 6, and 7. Prior to the description, assume that the current state is that immediately after the user selects "rated" on the rating tree 1302.

The CPU 101 determines in step S400 whether or not a user operation is detected. Since the current state is that immediately after the user selects "rated", the CPU 101 determines that a user operation is detected, and the process advances to step S401.

The CPU 101 determines in step S401 whether or not the user operation is an end instruction. Since the user operation is selection of the classification condition, the CPU 101 determines that the user operation is not an end instruction, and the process advances to step S402.

In step S402, the CPU 101 determines a classification condition type. Since the user selects "rated" on the rating tree 1302, the CPU 101 determines that the classification condition type is "rating".

In step S403, the CPU 101 loads a sort condition corresponding to the classification condition type determined in step S402 from a classification condition-sort condition correspondence table in FIG. 5 stored in an HDD 105. Since the classification condition type is "rating", the CPU 101 loads "rating" as the sort condition with reference to a row 505.

The CPU 101 determines in step S404 whether or not the sort condition designated in the sorting order list box 1307 by the user matches that loaded in step S403. Since the sort condition designated by the user is a rating order, the CPU 101 determines that the two conditions match, and the process advances to step S405.

in step S405, the CPU 101 determines detailed, information of the classification condition, and stores the determination result in the RAM 103. Since the user selects "rated" on the rating tree 1302, the CPU 101 determines that the detailed information of the classification condition is "rated of rating".

The CPU 101 determines in step S406 whether or not the classification condition stored in step S405 is included in a classification condition-grouping information correspondence table of FIG. 7 stored in the HDD 105. Since the classification condition-grouping information correspondence table includes "rating", the process advances to step S407.

In step S407, the CPU 101 groups and displays reduced images of image data corresponding to the classification condition. Details of the process in step S407 will be described below with reference to FIG. 6.

In step S601, the CPU 101 searches the DB stored in the HDD 105 to acquire image data which match the classification condition designated by the user. Since the classification condition is "rated", the CPU 101 searches for data having values not less than "1" in association with information stored in the rating column 206 of the DB to acquire matched image data and information associated with the image data. Then, the CPU 101 holds the image data and information in the RAM 103.

In step S602, the CPU 101 loads grouping information corresponding to the detailed information of the classification condition stored in step S405 from the classification condition-grouping information correspondence table of FIG. 7 stored in the HDD 105. Since the detailed information of the classification condition stored in step S405 is "rated", the CPU 101 loads grouping information with reference to a row 707. The grouping information is "rating value".

In step S603, the CPU 101 groups the image data held in the RAM 103 in step S601 based on the grouping information. Since the grouping information is "rating value", the CPU 101 groups image data having the same ratings into identical groups. Then, the CPU 101 holds the target image data in the RAM 103 in association with the groups. In this embodiment, assume that the number of groups is three, and the number of image data included in the first group is three, and the number of image data included in each of the second and third groups is four.

In step S604, the CPU 101 sorts the plurality of groups held in step S603 according to the sort condition. Since the sort condition is "rating", the CPU 101 sorts the groups in turn from smaller to larger rating values.

In step S605, the CPU 101 displays a character string of the classification condition on the classification condition display bar 314. The character string of the classification condition is the same as that in the focus frame 305. Since the classification condition selected by the user is "rated", the CPU 101 displays "rated".

In step S606, the CPU 101 substitutes 0 in a counter i.

The CPU 101 determines in step S607 whether or not the counter i is smaller than the number of target groups. Since the counter i=0 and the number of groups=3, the CPU 101 determines that the counter i is smaller than the number of groups, and the process advances to step S608.

In step S608, the CPU 101 sorts image data included in the 0th group according to the sort condition. Since the sort condition is "rating", the CPU 101 sorts image data in turn from smaller to larger rating values. However, since the image data have already been grouped for respective racing values, a sorting order of a plurality of image data cannot be uniquely decided. In this case, the image data are sorted in a shooting date and time order, as described in the first embodiment.

In step S609, the CPU 101 displays the 0th group name on the group boundary bar 308. As the group name, information in the DB corresponding to the grouping information is used. Since the grouping information is "rating value", the CPU 101 displays a rating value as the group name. When target data is data in a row 211 of FIG. 2, since it has "2" in the rating column 206, the group name is "rating 2".

In step S610, the CPU 101 substitutes 0 in a counter k.

The CPU 101 determines in step S611 whether or not the counter k is smaller than the number of target image data. Since the counter k=0 and the number of image data in the 0th group is three, the CPU 101 determines that the counter k is smaller than the number of target image data, and the process advances to step S612.

In step S612, the CPU 101 displays a reduced image corresponding to the 0th image data of the 0th group.

In step S613, the CPU 101 increments the counter k, and the process returns to step S611.

In step S614, the CPU 101 increments the counter i, and the process returns to step S607.

The CPU 101 repeats the aforementioned processes for each group in correspondence with the number of target groups, and repeats the aforementioned processes for each image data in correspondence with the number of target images, thus ending the display processing.

FIG. 13 shows an example of a display processing result UI window when the user selects "rated" on the rating tree 1302 so as to specify images to be displayed.

[Method of Displaying Images without Grouping when Classification Condition=Rating/Sort Condition=Shooting Date and Time]

When the user searches rated image data for those of a desired shooting date and time, he or she generally makes an operation for selecting rated and changing a sorting order to a shooting date and time order. Such operation is made based on the same reason as that when the classification condition is "folder" and the sort condition is "shooting date and time".

An image display method when the user selects "rated" and changes a sorting order to a shooting date and time order will be described below with reference to FIGS. 4 and 8. Prior to the description, assume that the current state is that immediately after the user selects a shooting date and time order in the sorting order list box 1307 after he or she selects "rated" on the rating tree 1302.

The CPU 101 determines in step S400 whether or not a user operation is detected. Since the current state is that immediately after the user selects the shooting date and time order, the CPU 101 determines that a user operation is detected, and the process advances to step S401.

The CPU 101 determines in step S401 whether or not the user operation is an end instruction. Since the user operation is a change instruction of the sort condition, the CPU 101 determines that the user operation is not an end instruction, and the process advances to step S402.

In step S402, the CPU 101 determines a classification condition type. Since the user selects "rated" on the rating tree 1302, the CPU 101 determines that the classification condition type is "rating".

In step S403, the CPU 101 loads, onto the PAM 103, a sort condition corresponding to the classification condition type determined in step S402 from the classification condition-sort condition correspondence table in FIG. 5 stored in the HDD 105. Since the classification condition type is "rating", the CPU 101 loads "rating" as the sort condition with reference to a row 505.

The CPU 101 determines in step S404 whether or not the sort condition designated in the sorting order list box 1307 by the user matches that loaded in step S403. Since the sort condition designated in the sorting order list box 1307 by the user is the shooting date and time order, and the sort condition loaded in step S403 is "rating", the CPU 101 determines that the two conditions do not match, and the process advances to step S408.

In step S408, the CPU 101 displays reduced images of image data corresponding to the classification condition without grouping them. Details of the process in step S408 will be described below with reference to FIG. 8.

In step S801, the CPU 101 searches the DB stored in the HDD 105 to acquire image data which match the classification condition designated by the user. Since the classification condition is "rating", the CPU 101 searches for data having values not less than 1 in association with information stored in the rating column 206 of the DB to acquire matched image data and information associated with the image data. Then, the CPU 101 holds the image data and information in the RAM 103.

In step S802, the CPU 101 displays a character string of the classification condition on the classification condition display bar 314. Since the classification condition selected by the user is "rated", the CPU 101 displays "rated".

In step S803, the CPU 101 sorts the image data acquired in step S801 in accordance with the sort condition. Since the sort condition is the shooting date and time order, the CPU 101 sorts image data in turn from older to newer shooting dates and times.

In step S804, the CPU 101 displays reduced images corresponding to the image data.

FIG. 14 shows an example of a display processing result UI window when the user selects "rated" on the rating tree 1302 so as to specify images to be displayed.

When the classification condition is "file type" or "location" and when the sort condition is "extension" or "place-name", image data are displayed by switching whether or not to execute grouping by the same method.

As described above, according to this embodiment, when the user searches arbitrary rated images for those of a desired shooting date and time, if a shooting date and time is selected as the sort condition, grouping is canceled, and image data are aligned in the shooting date and time order. Hence, since the user can easily estimate locations of desired images from those before and after diem, and images are displayed as groups, he or she can easily find images of the desired shooting date and time. The same applies to a search for image data of a desired file name, extension, or place-name. That is, by changing the sort condition, since grouping is canceled, and image data are aligned in a desired order, the user can easily find desired image data.

Also, according to this embodiment, when the user searches image data of an arbitrary file type for those of a desired shooting date and time, if a shooting date and time is selected as the sort order, grouping is canceled, and image data are aligned in the shooting date and time order. Hence, since the user can easily estimate locations of desired images from those before and after them, and images are displayed as groups, he or she can easily find images of the desired shooting date and time. The same applies to a search for image data of a desired file name, extension, or place-name. That is, by changing the sort condition, since grouping is canceled, and image data are aligned in a desired order, the use can easily find desired image data. On the other hand, when the user browses images in an extension order, since images are displayed while being grouped for respective file types, the conventional convenience can be maintained.

According to this embodiment, when the user searches image data of an arbitrary shooting location for those having a desired rating, if a rating order is selected as the sort condition, grouping is canceled, and image data are aligned in the rating order. Hence, since the user can easily estimate locations of desired images from those before and after them, and images are displayed as groups, he or she cart easily find images of the desired rating. The same applies to a search for image data of a desired file name, shooting date and time, or extension. That is, by changing the sort condition, since grouping is canceled, and image data are aligned in a desired order, the user can easily find desired image data. On the other hand, when the user wants to browse images in a place-name order, since image data are displayed while being grouped for respective place units one layer below, the conventional convenience can also be maintained.

According to this embodiment, whether or not to execute grouping is selected according to the classification condition and sort condition. Hence, the user can easily find desired images in various cases.

Note that this embodiment has exemplified the case in which the image display apparatus of the present invention is implemented by the client PC which communicates with the server via the network. However, the present invention may be applied to server computers on an online album site and other data service sites, which manage images on the network.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed, by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-205036, filed Sep. 18, 2012, which is hereby incorporated by reference herein in its entirety.

What is claimed is:

1. An image display apparatus which displays an arrangement of image data, the image data including images, the apparatus comprising:
   at least one processor; and
   a memory coupled to the at least one processor and having stored thereon instructions that, when executed by the at least one processor, cause the at least one processor to:
      select a classification condition of the images,
      designate a sort condition associated with a sorting order of the images,
      execute grouping of the images according to the selected classification condition,
      determine whether or not to execute the grouping based on a correspondence relationship between the selected classification condition and the designated sort condition,
      specify images to be displayed based on the selected classification condition, and
      sort the specified images and display the sorted images,
   wherein the displayed images are visually divided into groups with a boundary, in a case where a determination is made to execute the grouping,
   wherein the displayed images are not visually divided into groups with a boundary, in a case where a determination is made not to execute the grouping, and
   wherein a determination is made not to execute grouping of the images according to the selected classification condition in a case where the designated sort condition is not a sort condition corresponding to the selected classification condition even if the classification condition is selected.

2. The apparatus according to claim 1, wherein the classification condition is any of a shooting year-month-day, a folder, a rating, a file type, and a shooting location, and
   wherein the sort condition is any of a shooting date and time, a file name, a rating, an extension, and a place-name of image data.

3. The apparatus according to claim 2, wherein a sort condition corresponding to the classification condition is the shooting date and time when the classification condition is the shooting year-month-day, is the file name when the classification condition is the folder, is the rating when the classification condition is the rating, is the extension when the classification condition is the file type, and is the place-name when the classification condition is the shooting location.

4. The apparatus according to claim 1, wherein the memory has stored thereon further instructions that, when executed by the at least one processor, cause the at least one processor to sort the grouped images according to a sort condition corresponding to the classification condition, and display reduced images corresponding to image data to be processed.

5. The apparatus according to claim 1, wherein the classification condition has a hierarchical tree structure.

6. The apparatus according to claim 1, wherein the memory has stored thereon further instructions that, when executed by the at least one processor, cause the at least one processor to, when a sort condition corresponding to the classification condition is not designated, determine that the grouping is not executed.

7. The apparatus according to claim 6, wherein the memory has stored thereon further instructions that, when executed by the at least one processor, cause the at least one processor to, when grouping information corresponding to the classification condition is not available, determine that the grouping is not executed.

8. The apparatus according to claim 2, wherein grouping information corresponding to the classification condition is a month when the classification condition is a year of a shooting year-month-day, is a day when the classification condition is a month of the shooting year-month-day, is a day when the classification condition is a month of the shooting year-month-day, is a time when the classification condition is a day of the shooting year-month-day, is a folder immediately under which an image file to be processed is included when the classification condition is the folder, is a rating value when the classification condition is the rating, is a still image type when the classification condition is a still image as the file type, is a moving image type when the classification condition is a moving image as the file type, is a prefecture when the classification condition is a country as the shooting location, and is a city when the classification condition is a prefecture as the shooting location.

9. The apparatus according to claim 2, wherein the memory has stored thereon further instructions that, when executed by the at least one processor, cause the at least one processor to, when the classification condition is a shooting date and the sort condition is a shooting date and time, determine that the grouping is executed, and when the sort condition is not a shooting date and time, determine that the grouping is not executed.

10. The apparatus according to claim 2, wherein the memory has stored thereon further instructions that, when executed by the at least one processor, cause the at least one processor to, when the classification condition is a folder and the sort condition is a file name, determine that the grouping is executed, and when the sort condition is not a file name, determine that the grouping is not executed.

11. A control method of an image display apparatus which displays an arrangement of image data, the image data including images, the method comprising:
selecting a classification condition of the images;
designating a sort condition associated with a sorting order of the images;
executing grouping of the images according to the selected classification condition;
determining whether or not to execute the grouping based on a correspondence relationship between the selected classification condition and the designated sort condition;
specifying images to be displayed based on the selected classification condition; and
sorting the specified images and displaying the sorted images,
wherein the displayed images are visually divided into groups with a boundary, in a case where a determination is made to execute the grouping,
wherein the displayed images are not visually divided into groups with a boundary, in a case where a determination is made not to execute the grouping, and
wherein a determination is made not to execute grouping of the images according to the selected classification condition in a case where the designated sort condition is not a sort condition corresponding to the selected classification condition even if the classification condition is selected.

12. A computer-readable storage medium storing a program for causing a computer to execute a control method of an image display apparatus which displays an arrangement of image data, the image data including images, the method comprising:
selecting a classification condition of the images;
designating a sort condition associated with a sorting order of the images;
executing grouping of the images according to the selected classification condition;
determining whether or not to execute the grouping based on a correspondence relationship between the selected classification condition and the designated sort condition;
specifying images to be displayed based on the selected classification condition; and
sorting the specified images and displaying the sorted images,
wherein the displayed images are visually divided into groups with a boundary, in a case where a determination is made to execute the grouping,
wherein the displayed images are not visually divided into groups with a boundary, in a case where a determination is made not to execute the grouping, and
wherein a determination is made not to execute grouping of the images according to the selected classification condition in a case where the designated sort condition is not a sort condition corresponding to the selected classification condition even if the classification condition is selected.

13. The storage medium according to claim 12, wherein the classification condition is any of a shooting year-month-day, a folder, a rating, a file type, and a shooting location, and
wherein the sort condition is any of a shooting date and time, a file name, a rating, an extension, and a place-name of image data.

14. The storage medium according to claim 12, wherein in the grouping the grouped images are sorted according to a sort condition corresponding to the classification condition, and reduced images corresponding to image data to be processed are displayed.

15. The storage medium according to claim 12, wherein the classification condition has a hierarchical tree structure.

16. The storage medium according to claim 12, wherein when a sort condition corresponding to the classification condition is not designated, it is determined that the grouping is not executed.

17. The storage medium according to claim 13, wherein when the classification condition is a shooting date and the sort condition is a shooting date and time, it is determined that the grouping is executed, and when the sort condition is not a shooting date and time, it is determined that the grouping is not executed.

18. The storage medium according to claim 13, wherein when the classification condition is a folder and the sort condition is a file name, it is determined that the grouping is executed, and when the sort condition is not a file name, it is determined that the grouping is not executed.

* * * * *